United States Patent [19]

Booher

[11] Patent Number: 5,690,770

[45] Date of Patent: *Nov. 25, 1997

[54] PULTRUSION METHOD OF MAKING COMPOSITE FRICTION UNITS

[75] Inventor: Benjamin V. Booher, Scottsdale, Ariz.

[73] Assignee: Glasline Friction Technologies, Inc., Scottsdale, Ariz.

[*] Notice: The term of this patent shall not extend beyond the expiration date of Pat. No. 5,462,620.

[21] Appl. No.: 593,184

[22] Filed: Feb. 1, 1996

Related U.S. Application Data

[63] Continuation-in-part of Ser. No. 272,030, Jul. 8, 1994, Pat. No. 5,495,922, which is a continuation-in-part of Ser. No. 32,269, May 24, 1993, abandoned, which is a continuation-in-part of Ser. No. 647,137, Jan. 29, 1991, Pat. No. 5,156,787.

[51] Int. Cl.⁶ ................................................. B29C 70/52
[52] U.S. Cl. ........................ 156/177; 156/179; 156/269; 188/251 A
[58] Field of Search ............................. 156/177, 178, 156/179, 180; 188/269, 251 A, 251 R

[56] References Cited

U.S. PATENT DOCUMENTS

| | | | |
|---|---|---|---|
| 3,041,230 | 6/1962 | Diehl | 156/178 |
| 4,992,124 | 2/1991 | Kurihara et al. | 156/178 |
| 5,269,863 | 12/1993 | Middelman | 156/178 |
| 5,462,620 | 10/1995 | Booher | 156/180 |

FOREIGN PATENT DOCUMENTS

| | | | |
|---|---|---|---|
| 224253 | 10/1925 | United Kingdom | 156/178 |

*Primary Examiner*—Robert Davis
*Attorney, Agent, or Firm*—Baker, Maxham, Jester & Meador

[57] ABSTRACT

A composite friction unit includes a three dimensional composite body formed of a substantially uniform array of predominately glass strands of primary reinforcing fibers in matrix of phenolic resin material, the reinforcing fibers distributed throughout the body in a predetermined uniform distribution and orientation, and a substantially uniform array and distribution of secondary fibers extending transverse to the primary fibers thereby forming a friction unit having a predetermined size and configuration and uniform distribution and alignment of fibers throughout.

6 Claims, 3 Drawing Sheets

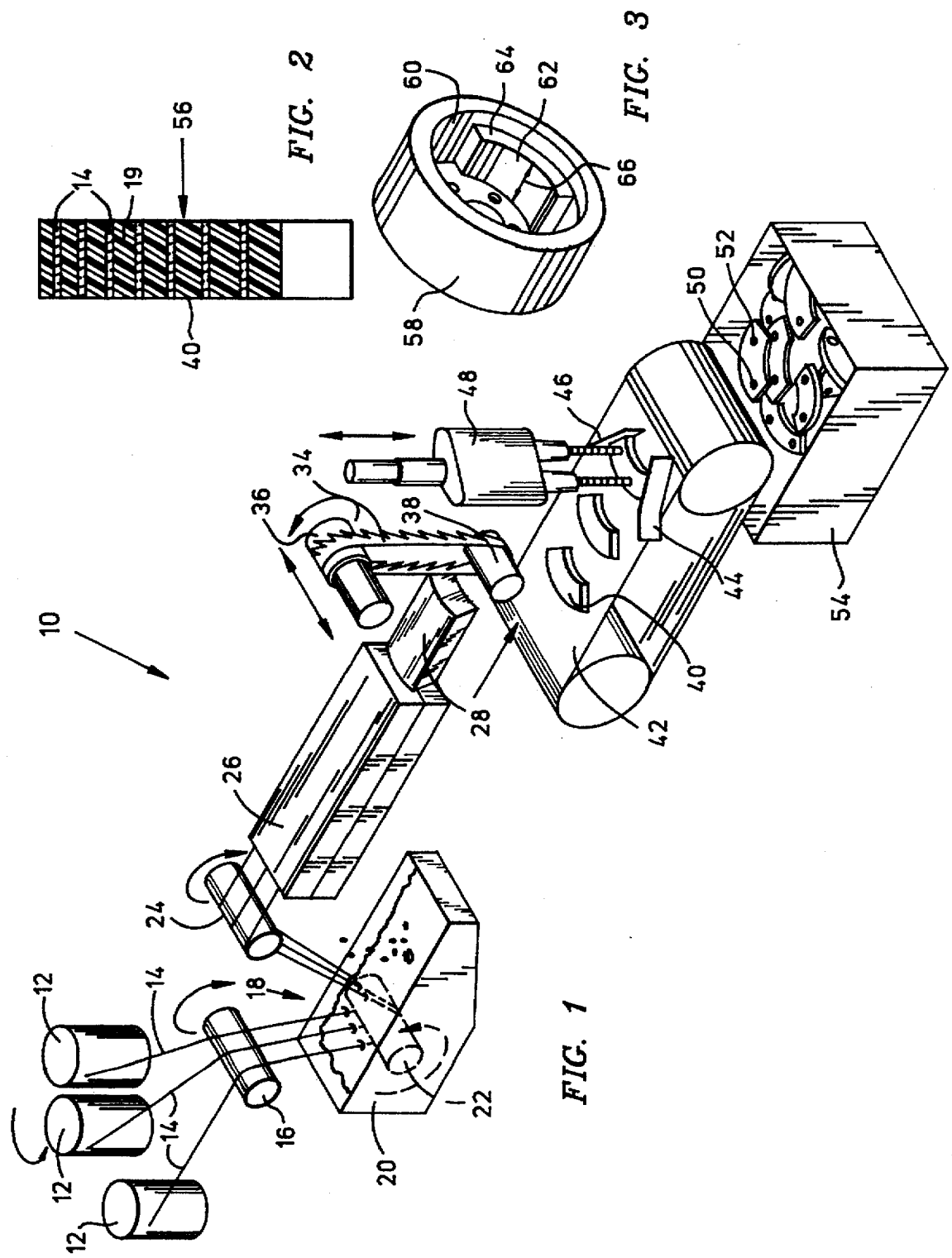

PULTRUSION METHOD OF MAKING COMPOSITE FRICTION UNITS

REFERENCE TO RELATED APPLICATION

This application is a Continuation-in-Part of my application Ser. No. 08/272,030 filed Jul. 8, 1994, now U.S. Pat. No. 5,495,922, entitled "UNIFORM COMPOSITE FRICTION UNITS", which is a Continuation-in-Part of Ser. No. 08/032,269, filed May 24, 1993, now abandoned, which is a Continuation-in-Part of Ser. No. 07/647,137, filed Jan. 29, 1991, now U.S. Pat. No. 5,156,787, entitled "PULTRUSION METHOD OF MAKING BRAKE LININGS".

BACKGROUND OF THE INVENTION

The present invention relates to composition friction elements and pertains particularly to improved friction units and method and composition for making same.

A friction brake is basically a pair of friction elements, one rotating and one stationary, brought into engagement to produce a friction force measured as brake torque for either slowing or stopping the rotating element. Brakes are designed so that the brake torque is somewhat proportional to the input force used to engage the elements. Unfortunately, pressure is not the only factor that influences the frictional response of the brake elements. Friction effects between friction elements cause friction force and brake torque to vary with engaging pressure, speed, and temperature, and to depend upon deposited interfacial film for stability.

The rotating element of a brake system is usually a steel disc or drum, and the stationary element is usually a composition pad or shoe lining. The materials forming the composition element are the principle unpredictable variables that have the greatest affect on the performance characteristics of the brake system. Desirable materials for the composition element must have good friction, wear and heat resistant characteristics. This includes good face resistance, or the ability to maintain good (preferably substantially uniform) braking with heat buildup.

Until recent years, the predominant material used in the manufacture of friction pads and discs for brakes, clutches and the like was asbestos. These were manufactured by a molding process where each unit was formed in a mold cavity. However, it was discovered that asbestos is a carcinogenic substance, and that such use released potentially harmful amounts of it into the environment. For this reason, some industrialized countries prohibit the use of asbestos friction materials, and others including the United States require the use of asbestos to be phased out over the next few years. Therefore, there exists an urgent need for safe and effective friction materials and economical methods of manufacturing the materials into suitable friction units.

Extensive efforts have been put forth in recent years in an effort to find suitable environmentally safe materials and compositions having the desirable wear, heat and other characteristics to serve as a substitute for asbestos. These efforts have been frustrated by the many and varied parameters involved, including the range of needs to be met. For example, different size vehicles require different size friction pads and often have other variables including higher operating forces and temperatures.

Attempts to satisfy the need for long life, high friction heat resistant friction materials have included proposals to utilize various chopped fibers molded in a bonding matrix, such as a resin. The friction unit is formed in the traditional fashion by a molding process, with the fibers randomly oriented and placed in a binder, such as either a dry powder resin cured under heat and pressure, or placed in a liquid resin in a mold and cured. Examples of these compositions and manufacturing methods are disclosed in U.S. Pat. No. 4,119,591, granted Oct. 10, 1978 to Aldrich, U.S. Pat. No. 4,259,397, granted Mar. 31, 1981 to Saito et al., and U.S. Pat. No. 4,432,922, granted Feb. 21, 1984 to Kaufman et al.

However, friction units made by this method are expensive to manufacture and have not been satisfactory, because of their lack of uniformity in performance and durability. For example, units from the same batch may vary as much as 35% in performance characteristics. The non-uniformity of results has been found to be caused largely by a non-uniformity of distribution and orientation of the fibers in the matrix. This not only creates expensive inspection and quality control problems, it can also create maintenance problems, and sometimes even hazardous conditions. For example, pads that have been matched for performance at initial installation may vary over their useful life.

In my aforementioned parent applications, I disclosed improved compositions and methods of manufacture for brake pads and linings. However, continuous work on perfecting these indicate that further improvements in both compositions and methods of manufacture are desirable and have been developed as set forth herein. For example, insufficient transverse mechanical properties were found to be a problem among many samples produced by the pultrusion process. Another problem included excessive voids in some samples.

Accordingly, it is desirable that improved compositions, structures and methods be available to overcome the above and other problems of the prior art.

SUMMARY OF THE INVENTION

It is the primary object of the present invention to provide improved brake friction linings compositions and methods of manufacturing.

Another object of the present invention is to provide improved pultrusion process for the manufacture of friction elements.

In accordance with a primary aspect of the present invention, friction units are manufactured by a pultrusion process and comprise a composition of a controlled density and orientation of an array of primary fibers with secondary reinforcing fibers in a phenolic resin with selected minor quantities of one or more of various mineral and/or metal powders.

Another aspect of the invention includes friction units made by a continuous process comprising the steps of selecting and wetting a uniform array of primary strands of reinforcing fibers with a liquid phenolic resin material, adding strands of secondary reinforcing fibers transverse to said primary strands, pulling the impregnated strands of reinforcing fibers through a composite forming die for forming a body having at least a portion of the peripheral configuration of the friction units, and selectively cutting the body into a plurality of the friction units.

In accordance with another aspect of the invention, a minor quantity of up to about 5% of milled or chopped fibers are added to the resin formulation and is picked up with the resin and moves with the strands of primary reinforcing fibers as they are pulled through the liquid resin formulation and through a forming die for forming a body of friction units.

BRIEF DESCRIPTION OF THE DRAWING

The above and other objects and advantages of the present invention will become apparent from the following description when read in conjunction with the accompanying drawings wherein:

FIG. 1 is a perspective view schematically illustrating an apparatus and a preferred method of carrying out the invention;

FIG. 2 is a detailed sectional view of a brake pad in accordance with the invention;

FIG. 3 is a perspective view of a brake shoe lining in a drum type brake in accordance with the invention;

DETAILED DESCRIPTION OF THE PREFERRED EMBODIMENTS

Figure 4:
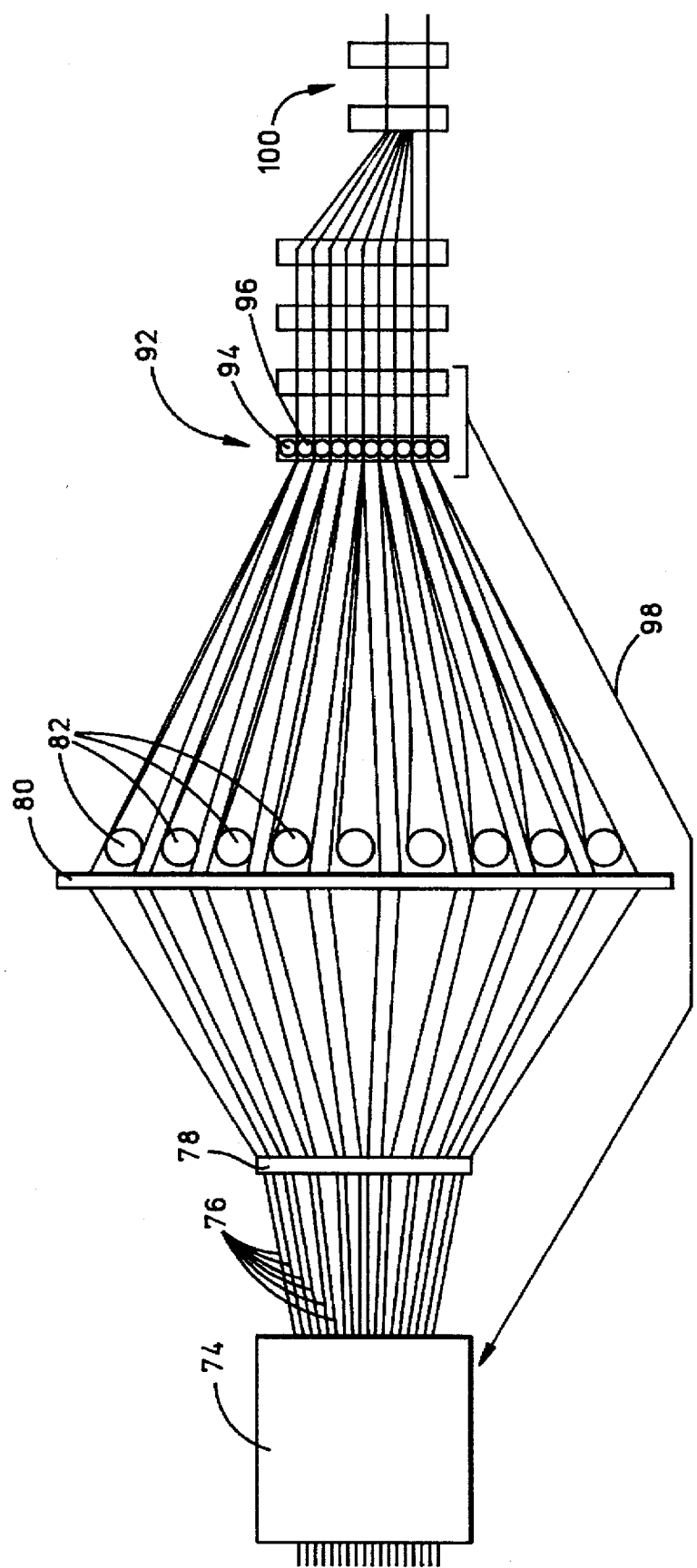
FIG. 4 is a schematic illustration of an apparatus like that of FIG. 1 modified for carrying out a preferred method of the invention.

Referring to FIG. 1 of the drawing, there is schematically illustrated the simplest form of an exemplary system for carrying out a the process of the invention for making brake friction units in accordance with the invention. The system, designated generally by the numeral 10, comprises a plurality of creels 12 from which a plurality of strands 14 of an elongated continuous fiber or arrays of fiber are drawn and passed through suitable guide means across suitable guide rollers or bars 16 to and through an impregnating or wetting bath 18 of a suitable resin such as a phenolic resin. The fibers may be in the form of individual strands, woven fabrics, matting, or stitched fabrics or combinations of them.

The fibers or strands 16 are the primary fibers and are coated or wetted by a resin in any suitable manner. In the illustrated embodiment they pass into or through a bath of a suitable liquid resin contained within a reservoir 20 for wetting or impregnating the fibers or strands. They can also be wetted by resin injection such as by pumping resin into a ring that surrounds the rovings. The fibers 14 will in reality number in the hundreds in several rows which may be parallel and are guided through or beneath suitable guide roller or other guide means 22 in the resin bath and over guide rollers or other guide means 24 and into a die 26 for imparting at least a part of the final shape or configuration of the friction units.

The strands, particularly if glass fibers, may require a sizing treatment, i.e. application of a compound or chemical to insure a good or complete wetting of the fibers and a good bond between the fibers and matrix. A bulked roving (bunch of strands or fibers) is preferably used. Bulked roving is produced by a process in which a standard roving is fractured or splintered by forced cold air. This provides two useful properties, 1) increased diameter which assists in providing fill to low glass content pultrusion, and 2) the "splinters" provide for good mechanical bonding with the resin matrix.

The resin wetted strands are passed or pulled through the die 26, where they are shaped into part of the desired configuration and at least partially cured. The fiber and resin composition is preferably at least partially cured in the die by any suitable means such as ultraviolet (UV) radiation, radio frequency (RF), heating or other means, and the fibers will thereby remain in tension. The composite unit emerges, or more particularly is pulled in tension from the die in the form of an elongated continuous bar or block 28 having at least part of the peripheral configuration of the brake pad or other article being manufactured. In the case of brake pads, the bar preferably has the precise peripheral configuration of the final pad. The bar or block 28 is forced or pulled from the die 26 by suitable means, such as hydraulic pullers, tractors (not shown) or the like, and positioned to be cut into individual friction or brake pad units or pieces in the illustrated embodiment. The pultrusion process provides a substantially controlled or predetermined distribution and orientation of the primary fibers throughout the body of the friction unit.

In the illustrated embodiment, a suitable cutting apparatus, such as a band saw 34 supported on its pulleys or rollers 36 and 38, is movable transverse to the axis or movement of the bar 28 for sawing the bar into a plurality of brake pads 40. Other suitable cutting apparatus may be utilized, such as water jets, laser, abrasive or other means. The cut surface represents the friction surface in this embodiment, and the fibers are preferably substantially normal or perpendicular to this surface. It may be desirable in some instances to provide a different angularity to the fibers in relation to the friction surface. This can be accomplished by cutting the friction units from the bar at the desired angle to the axis thereof.

The brake pads, upon being cut from the bar, fall onto a conveyer belt 42 and are moved into position held by a jig or fixture 44, 46 for operation of a punch or drill press 48 for forming mounting holes 50 and 52 in the brake pads for attachment to a backing plate. The pads or linings may be adhesively bonded to a backing plate, in which case the holes may be eliminated. The pads are then accumulated in a suitable storage container or bin 54, where they are then packaged and shipped. This provides a highly efficient and economical manufacturing process.

Referring to FIG. 2, a section view through a brake pad 40 is illustrating glass fibers 14 in a matrix of thermoplastic material 19. The primary fibers 14 are shown substantially perpendicular to a friction surface 56 of the brake pad 40. Other friction devices, such as clutch pads, would preferably have similarly oriented strands or fibers. The density and mixture of primary fibers as well as secondary fibers may be varied to suit the particular application. Specifically, in the case of brake shoes, however, the orientation of the primary fibers may be in a drum transverse to the drum surface. The fibers are pulled through a die having the curve or arc of the desired shoe and selectively cut width-wise. In this application the cut surface does not represent the friction surface. A secondary preparation step, such as grinding, must be performed to attain the desired surface.

While brake pads are illustrated in the process, it is apparent that clutch friction pads and brake shoe type of pads or linings may also be manufactured by this process. The die is set to shape one peripheral outline of the emerging articles and can include annular shapes. In the case of pads for disc rotors, the fibers are oriented uniformly at an angle preferably normal to the friction surface for the highest efficiency of manufacture. However, in certain applications, an orientation parallel to the friction surface may be satisfactory or even preferred for manufacturing as well as performance. For example, in a brake shoe and drum configuration as illustrated in FIG. 3, the fibers may preferably run parallel to the friction surface for ease of manufacturing. This orientation is preferred where inner laminate shear strength is a factor. As illustrated, a typical brake drum 58 is illustrated having an inner friction surface 60 engaged by a brake shoe lining 62. The lining 62 is formed of fibers, the ends of which are shown at 64, with the fibers oriented substantially parallel to the friction surfaces as indicated along arrow 66. This orientation of the fibers provides for an economical construction of brake friction units in a pultrusion process. Thin curved pultruded bars or slabs can be cut as in the FIG. 1 illustration to form the liner units.

The shoe linings may be formed by the pultrusion process in the form of a thin arcuate slab, and the linings cut to width as described above with respect to pads. This provides an economical technique for producing consistently uniform units. However, where orientation of the fibers normal to the friction surface is desired, a rectangular slab may be cut along an arc to form the curved friction surfaces.

The articles may be cut from the pultruded bar by any suitable means, such as by laser, water or other means. The present method and process provides a highly efficient manufacturing process for the production of high quality friction units that are asbestos free and/or a controlled uniform composition and quality. The pultrusion process enables rapid production and the careful control of fiber density, mixture, and orientation on a continuous basis.

Figure 5:
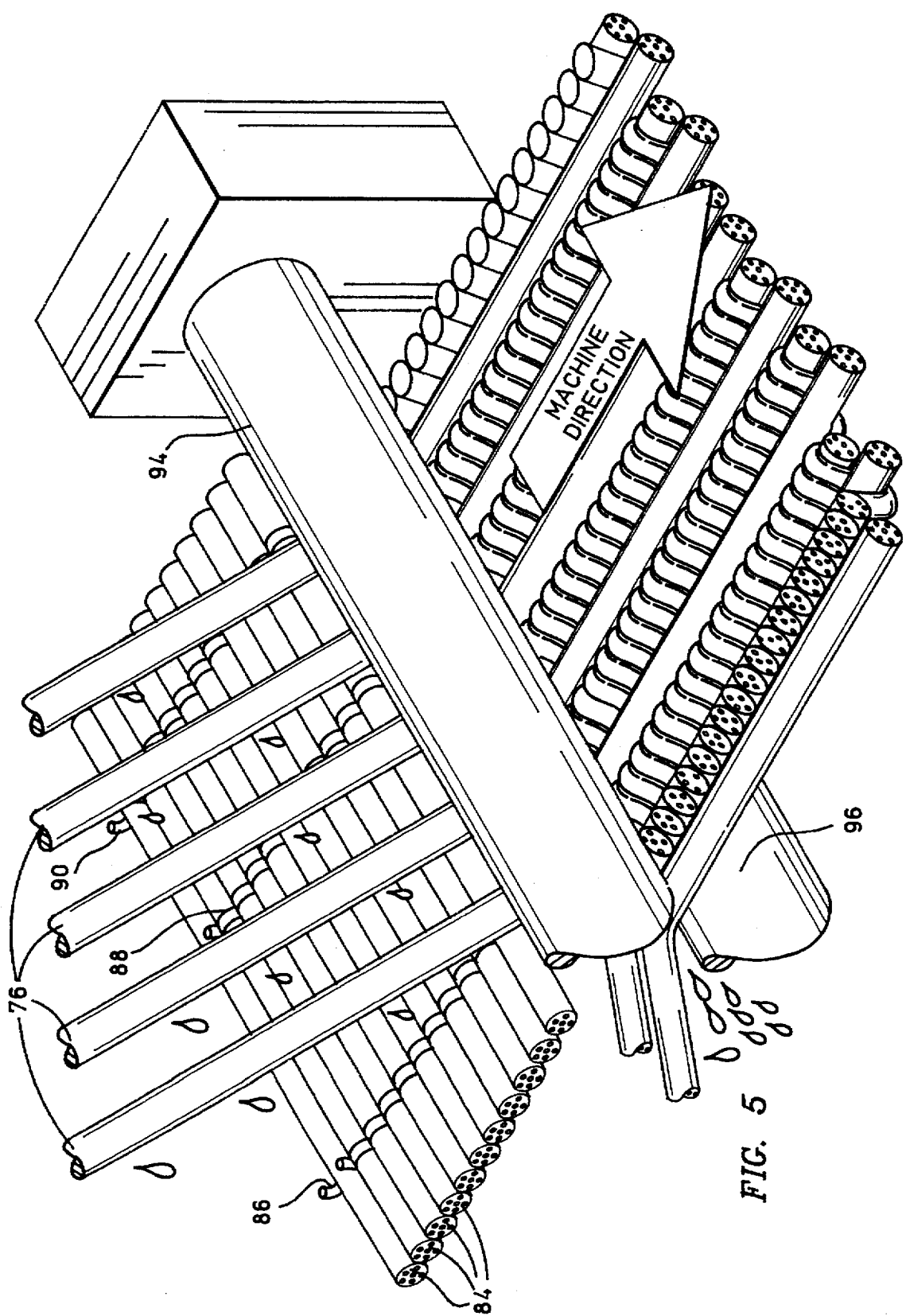
FIG. 5 is an enlarged detailed view of elements being assembled in accordance with the invention.

The primary reinforcing fibers 14 for the brake pads or linings are preferably glass fiber, but the pad may contain other materials and fibers or combinations thereof. In addition, other fibers may be woven or distributed in with the glass fibers in various selected distributions and proportions to alter and or enhance certain characteristics. For example, various fibers may be distributed in various concentrations substantially uniformly throughout the unit for optimizing various parameters such as inner laminar shear strength, wear, fade, and cooling. The addition of secondary reinforcing fibers can be accomplished in several ways. One preferred way is as illustrated in FIGS. 4 and 5.

Many different fibers or strands and combinations may be utilized, including but not limited to glass, rock, ceramic, carbon, graphite, aramid, nomex, wool and cotton fibers of other organic and inorganic materials. Various metallic fibers such as copper and aluminum, may also be utilized in various proportions with non-metallic fibers. In one preferred composition, the fibers are about 20% by weight of wool or cotton fibers applied in a second stage wetting process to extend transverse to the remaining fibers.

The manufacturing system and process, as illustrated, provides for the controlled predetermined orientation of the primary fibers, as well as the controlled predetermined uniformity and density of the primary fibers within the resin matrix. For example, the composition of the friction device determines many of its characteristics, such as its durability, heat resistance, and friction resistance. With this process, the primary fibers may be controllably distributed and oriented uniformly at any suitable angle to the friction surface of the brake pad or friction device. Thus, the process and materials have the capability of providing superior, predictable and consistent performance.

The process may include the addition of secondary fibers that extend transverse to the primary fibers in order to add shear strength to the units. In one form of the process, as illustrated in FIGS. 4 and 5, dry transverse fibers in the form of stitched fabric are introduced between selected layers of the primary fibers. Referring to FIG. 4, a pultrusion system is illustrated and designated generally by the numeral 72. The system includes a wet out pan 74 through which a plurality of primary strands 76 or rovings are passed from a source, such as a plurality of spools or bobbins (not shown). The primary strands 76 which may number in the hundreds pass through a first guide 78, of traditional form and a second guide 80 added in accordance with the present invention. The guide 80 spreads the primary fibers to accommodate a plurality of secondary transverse fiber spools 82 which are positioned between selected pairs of primary fiber strands 76. These spools 82 carry rolls of short dry transverse fibers 84 which are stitched together by threads 86, 88 and 90 as shown in FIG. 5. Excess resin stripped away as the rovings pass through the strippers is returned via suitable conduit or the like 98 back to the reservoir 74.

The secondary fibers are of a length to extend across the full width of the array of primary fibers as they pass into and through a stripper station of one or more strippers designated generally at 92 comprising pairs of stripper bars 94 and 96. The dry transverse secondary fibers are entrapped between the converging wet rovings of primary fibers and become woven into a transverse interlock as illustrated in FIG. 5. For example, it has been found that the transverse fibers must be about eight inches or more in length in order to extend fully across a six inch wide production price. These transverse fibers are carried along with the primary fibers as they are pulled into and through the preforming and final forming dies 100 for completion of the friction blanks. The transverse fibers may be present in the amount of about 1% up to about 20% of the total fibers.

Milled or chopped fibers such as glass, wool or cotton fibers may also be added and introduced into the matrix material and are picked up by the elongated primary strands of fibers as they pass through the resin. The fibers are in the range of from 1% to about 5% by weight of the matrix material. The short fibers are preferably in the approximate range of 0.015 inch to about 0.062 inch and dispersed somewhat randomly throughout the matrix. This dispersement of milled fibers provides multi-axis mechanical reinforcement, as well as crack and compression resistance in areas to be machined for mounting purposes. In this process, may be mixed in the primary resin reservoir, or in the alternative two reservoirs of resin may be used. In one arrangement a first tank contains a low viscosity resin to enhance the wetting of the fibers (preferably predominately glass fibers) as they are passed through. The fibers then pass through a second tank of higher viscosity resin containing many of the fillers and chopped wool, cotton or other fibers. The chopped fibers preferably make up from about 1% to 5% of the fibers. They will be picked up by the primary strands of fibers and will generally extend transverse to the primary fibers with proper modification of the handling equipment. Other fibers may also be used in this way. These and the transverse fibers may be used together or in the alternative to achieve the desired shear strength.

The matrix material may be any suitable resin that is either a thermoplastic material or non-thermoplastic material, and it may require various forms of curing. It may be cured, for example, by cooling, heating, or by the use of UV or other radiation or the like. However, the materials must be capable of enabling the forming of the units by the pultrusion process.

One suitable phenolic resin is available from BP Chemicals under the trademark "CELLOBOND" and product designation J2041L. This product is described as a high viscosity phenolic for use in heat cured pultrusion, does not require any catalyst and will provide reasonably fast line speeds and cure cycles. This provides enhanced efficiency in production. In some cases, the manufactured unit must be post cured to assure the best performance. For example, it may be baked at about 500 degrees Fahrenheit for one or more hours. Preheating may also be required for larger cross sectional units. This may be taken care of in any suitable manner, such as by use of an RF oven and usually requires low temperature from about 80 to 150 degrees Fahrenheit.

Another suitable resin is resorcinol-modified phenolic resin available under the trademark Rescorciphen from INDSPEC Chemical Corporation.

The matrix material will be formulated to include heat dissipation and/or friction modifiers, such as graphite and/or non-ferrous metallic powders. For example, from about one to ten percent by weight of one or more fillers and/or modifiers, such as graphite powder and/or one or more non-ferrous metallic powders, may be incorporated into the matrix material. Other materials include but are not limited to mineral filler, rubber powder, copper powder, ceramic powder, nut shell flower (such as walnut or cashew). These may each be in the amount of one percent (1%) to ten percent (10%) and preferably in the amount of 3% to 5% by weight. Nut flower has been found to increase the shear strength of the unit and to enhance the fade characteristics of pads or linings. During braking, heat breaks down the nut shell flower causing nut shell oil to combine chemically with the resin polymer molecule in a process known as chain branching. Thereby, the polymer becomes stronger and more able to withstand high temperatures that contribute to brake fade. The ceramic powder is preferably in the form of hollow spheres of about seven to ten microns. These have been found to serve as a lubricant in the pultrusion process and to enhance the hardness and wearability of the friction units.

The resins may be aqueous based and contain compounds or additives known as molecular sieves to reduce and/or eliminate by product which may cause voids in the product. Suitable such molecular sieve materials are available as both sodium activated and hydrated chabazite in several mesh sizes. These products absorb gases and water, reduce potential voids or cracks due to gases and vapor. The typical chemical names are sodium aluminosilicate and calcium aluminosilicate. These are in powder form and may be added in amounts of from about 1% to about 5% by weight of resin.

Another additive which has shown to reduce the amount of water vapor formed during the process is barium sulfate (BaSo$_4$) commonly referred to as barite.

The resins may also be non-aqueous based which would eliminate or reduce the need for molecular sieves. The resin may also be low condensation resin which produces less water by products.

The fiber to resin matrix may vary from about one pan fiber to two part resin, up to about three part fiber to one part resin. A preferred fiber to matrix composition is from about 60% to 75% fiber to 25% to 40% resin or matrix mix. The matrix preferably has from 5% to 10% by weight of one or more of graphite powder, copper powder, aluminum powder and the aforementioned powders. In addition, aramid pulp and other synthetic fiber pulps may be added or distributed throughout the matrix material.

Certain thermoplastic materials may be desirable for other specific applications. The thermoplastic material may, for example, be a suitable polyester and may also have components such as powders of graphite or other material to aid in friction control and the dissipation of heat. For example, a one to about ten percent by weight of graphite powder uniformly distributed throughout the thermoplastic material aids in the dissipation of heat. Alternate compositions may include small amounts of other materials, such as non-ferrous metallic powders, such as copper, aluminum or the like. For example, a one to ten percent by weight copper powder may also be utilized to enhance the dissipation of heat. Thus, the composition must be compatible with the pultrusion process and at the same time provide satisfactory friction units.

I have discovered that various proportions and compositions of materials can affect the pultrusion process as well as the performance characteristics of the brake pad and lining units. For example, many test samples with many ranges of examples of compositions have been constructed and tested in order to optimize friction units. In recent tests the best formulation was found to be 100 parts resin, 12 parts barite, 12 parts copper powder (SG5), 2 parts nut shell flower, 10 parts butadience-acrylonitrile elastomer (BAE), 4 parts talc and 113 parts glass fibers. This formulation produced the best crack free specimens. Die temperature for a one inch diameter specimen was 300° F.–400° F. at pull speeds of about 2–3 inches per minute. Core temperature was in the range of about 120° F.–140° F. Talc was substituted for graphite and provided lubrication without decreasing shear strength.

While I have illustrated and described my invention by means of specific embodiments, it is to be understood that numerous changes and modifications may be made therein without departing from the spirit and the scope of the invention as shown in the appended claims.

I claim:

1. A continuous manufacturing process for making composite friction units comprising the steps of:

selecting a substantially uniform array of predominately glass strands of primary reinforcing fibers;

wetting said plurality of strands of primary reinforcing fibers with a phenolic resin material;

pulling said wetted strands of reinforcing fibers in a predetermined uniform distribution and orientation through a composite forming die for forming a body having a peripheral configuration of said friction units;

introducing a continuous array of predominately transverse secondary fibers between selected pairs of said plurality of primary fibers prior to entry into said forming die;

solidifying said body by curing said resin; and selectively cutting said body at least along one path transverse to said strands into it plurality of said friction units, thereby forming a plurality of friction units having a predetermined size and configuration and uniform distribution and alignment of fibers throughout.

2. A process according to claim 1 wherein the step of selecting said primary reinforcing fibers selecting said fibers to make up about 50 to about 70% by weight of said body, and said step of introducing said secondary fibers includes introducing sufficient secondary fibers to make up from 5% to 20% by weight of said body.

3. A process according to claim 2 wherein said resin is selected to contain one to ten percent by weight of powder taken from the group consisting of rubber, copper, barite, talc, ceramic, and nut shell flower.

4. A process according to claim 1 wherein said resin is selected to contain about 2 to 5% by weight of talc powder, about 5 to 10% by weight of copper powder and 3 to 5% by weight of one of nut shell flower.

5. A process according to claim 1 wherein said step of cutting said body is at an angle other than ninety degrees and forms a friction surface at said angle to the fibers.

6. A process according to claim 1 wherein said step of heating said resin is carried out by RF prior to entry of the fibers into the die.

* * * * *

UNITED STATES PATENT AND TRADEMARK OFFICE
CERTIFICATE OF CORRECTION

PATENT NO. : 5,690,770
DATED : Nov. 25, 1997
INVENTOR(S) : Booher

It is certified that error appears in the above-indentified patent and that said Letters Patent is hereby corrected as shown below:

Column 7, line 38 "pan" should read -- part --.

Signed and Sealed this

Thirteenth Day of January, 1998

Attest:

BRUCE LEHMAN

Attesting Officer

Commissioner of Patents and Trademarks